(12) United States Patent
Lundgren

(10) Patent No.: US 6,742,686 B2
(45) Date of Patent: Jun. 1, 2004

(54) LOAD CARRIER FOOT ARRANGEMENT

(75) Inventor: Anders Lundgren, Grimsas (SE)

(73) Assignee: Thule Sweden AB, Hillerstorp (SE)

( * ) Notice: Subject to any disclaimer, the term of this patent is extended or adjusted under 35 U.S.C. 154(b) by 93 days.

(21) Appl. No.: 10/063,936

(22) Filed: May 28, 2002

(65) Prior Publication Data

US 2003/0000979 A1 Jan. 2, 2003

(30) Foreign Application Priority Data

May 28, 2001 (SE) ................................................ 0101891

(51) Int. Cl.[7] ................................................. B60R 9/00
(52) U.S. Cl. ...................... 224/321; 224/322; 224/329; 224/330; 224/331
(58) Field of Search ................................ 229/321, 322, 229/329, 330, 331, 319

(56) References Cited

U.S. PATENT DOCUMENTS 6,305,589 B1 * 10/2001 Chimenti et al. ............ 224/321
6,382,483 B1 * 5/2002 Kleb et al. .................. 224/321
6,398,090 B1 * 6/2002 Chimenti .................... 224/321
6,419,134 B1 * 7/2002 Grimm et al. ............... 224/331

* cited by examiner

Primary Examiner—Lee Young
Assistant Examiner—Maerena W. Brevard
(74) Attorney, Agent, or Firm—Novak Druce LLP

(57) ABSTRACT

A load carrier foot arrangement comprising a load carrier foot (3) which is mounted on a rail profile (2) which exhibits a mounting opening (12), wherein the load carrier foot is secured to the rail profile by means of a locking device having a locking spindle (21) which actuates a locking plate (27) and locks the foot to the rail profile, and wherein a retaining catch (32) is eccentrically and rotatably disposed on the locking spindle, which retaining catch interacts with notches (13) in the rail profile to prevent unwanted movement of the load carrier foot along the rail profile when the locking device is in locked position, the retaining catch having for this purpose a stop face (38) and a sensing element (39), that the retaining catch is prestressed by a tensioning element (37) to a position such that the stop face interferes obstructively with an edge region (41) of the load carrier foot (3) when the sensing element is not actuated, and that the mounting opening (12) is of such a size that the sensing element is not actuated when the load carrier foot is mounted in the mounting opening.

20 Claims, 8 Drawing Sheets

LOAD CARRIER FOOT ARRANGEMENT

CROSS REFERENCE TO RELATED APPLICATIONS

The present application claims priority to Swedish Patent Application No. 0101891-0 filed May 28, 2001. Said application is expressly incorporated herein by reference in its entirety.

BACKGROUND OF INVENTION

1. Technical Field

The present invention relates to a load carrier foot arrangement, comprising a load carrier foot which supports a load carrier and which is designed to be mounted on an elongated rail profile which is mounted on a vehicle body, preferably the roof thereof. The rail profile has a cross-section exhibiting a cavity and upturned walls enclosing between them a gap which is in communication with the cavity and wherein the walls in one area thereof exhibit a mounting opening in which the load carrier foot is mounted. At least one of the walls exhibits along its length one or more notches and the load carrier foot has a locking device including a locking plate which is located in the cavity when the load carrier foot is mounted on the rail profile. The locking plate is attached by connecting elements to a locking spindle which is rotatably mounted in the load carrier foot and equipped with a first set of eccentric cams to which the connecting elements are attached in such a manner that the locking plate is moved towards and away from the load carrier foot depending on the direction of rotation of the locking spindle. By this action, the locking plate is brought into engagement with the walls of the rail when moved in the locking direction towards the load carrier foot and in this way the load carrier foot is prevented from moving along the rail profile. The locking spindle has a second eccentric area to which a retaining catch is rotatably mounted. The retaining catch, when the locking plate is moved in the direction of the load carrier foot, is inserted into a notch in the rail when the load carrier foot is so positioned on the rail profile that the retaining catch assumes a position on the rail profile which is aligned with a notch. In this way, any movement of the load carrier foot along the rail profile is prevented through the interference of the retaining catch with the edges of the notch in the event that the load carrier foot shifts on the rail profile.

2. Background Art

A load carrier foot arrangement having similar purpose to that described above is disclosed in Swedish Patent Application SE 9901417-7. The drawback of this earlier solution, however, is that it is possible to mount the load carrier foot on the rail profile in the mounting area and, while the foot is still in this area, to turn the locking spindle to the locked position without either the locking plate or the retaining catch coming into engagement with the rail profile. This results in the load carrier foot not being secured to the rail profile, which can have disastrous consequences if the load carrier comes loose from the rail profile while the vehicle on which it is mounted is in motion. A further drawback of this earlier known solution is that it can be difficult to bring the load carrier foot into such a position on the rail profile that the retaining catch coincides with a notch in the rail. This means that exact fitting is required, which can be perceived as bothersome and irritating.

SUMMARY OR INVENTION

The present invention overcomes the above-mentioned drawbacks by means of an arrangement of the type earlier described and characterized in that the retaining catch possesses a stop face and a sensing element. The retaining catch is prestressed by a tensioning means to a position such that the stop face interferes obstructively with the load carrier foot and prevents rotation of the locking spindle in a locking direction when the sensing element is not actuated. The mounting opening is of such a size that the sensing element is not actuated when the load carrier foot is installed in the mounting opening.

The present invention is further characterized in that the sensing element, when the load carrier foot is moved along the rail profile away from its original mounting or installation position, it is continuously actuated in opposition to the prestressing force by the rail wall that exhibits the notches to assume a position such that the stop face can move past the load carrier foot, but in which position the stop face interferes obstructively with the top of the rail wall and prevents rotation of the locking spindle in the locking direction.

The present invention may further be characterized in that the retaining catch exhibits a stop face and a sensing element and that the retaining catch is prestressed by a tensioning means to a position such that the sensing element contacts the rail wall having the notches as the load carrier foot is moved along the rail profile. Further, the sensing element is snapped into the notches by the prestressing force as the sensing element moves past such notches thereby providing an indication of those positions of the load carrier foot on the rail in which the retaining catch can be inserted down into the notch.

BRIEF DESCRIPTION OF DRAWINGS

The invention will be described below with reference to an exemplary embodiment that is shown in the attached drawings in which.

DETAILED DESCRIPTION

Figure 1:
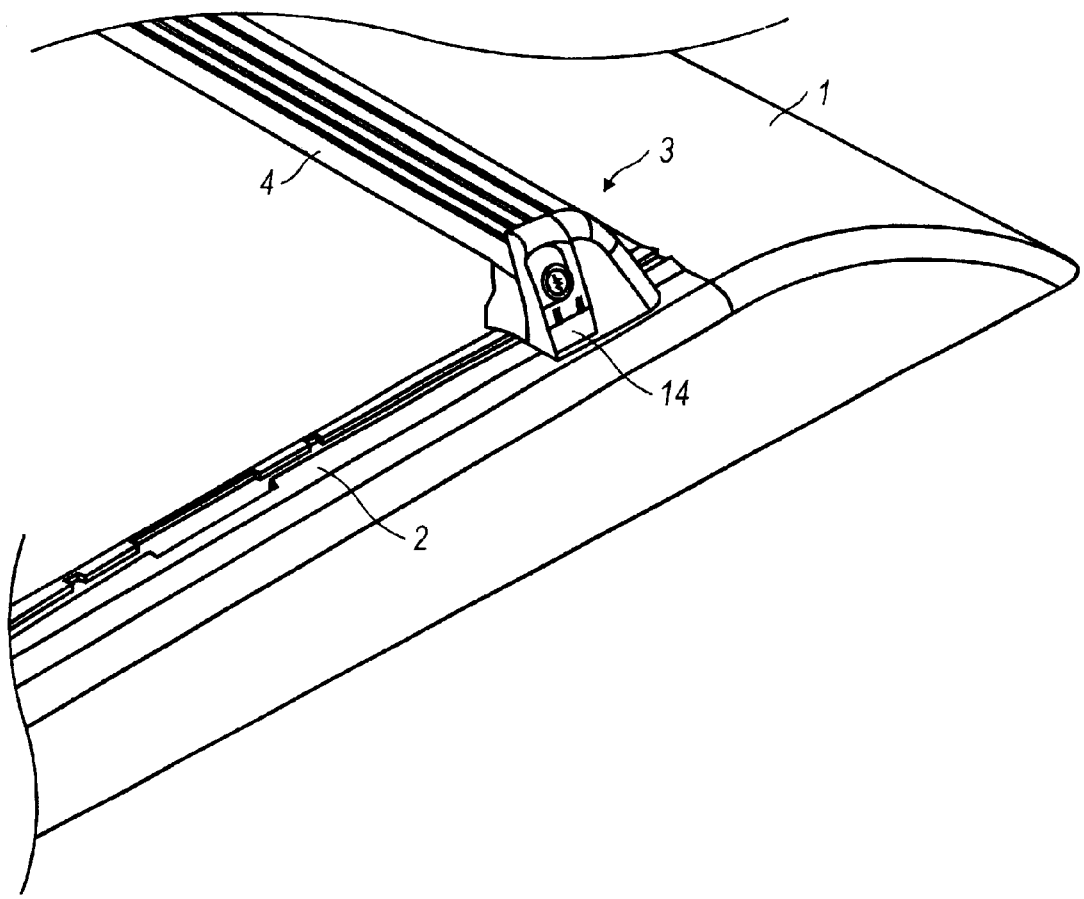
FIG. 1 is a partial perspective view of a vehicle roof having a load carrier foot arrangement configured according to the present invention.
Figure 2:
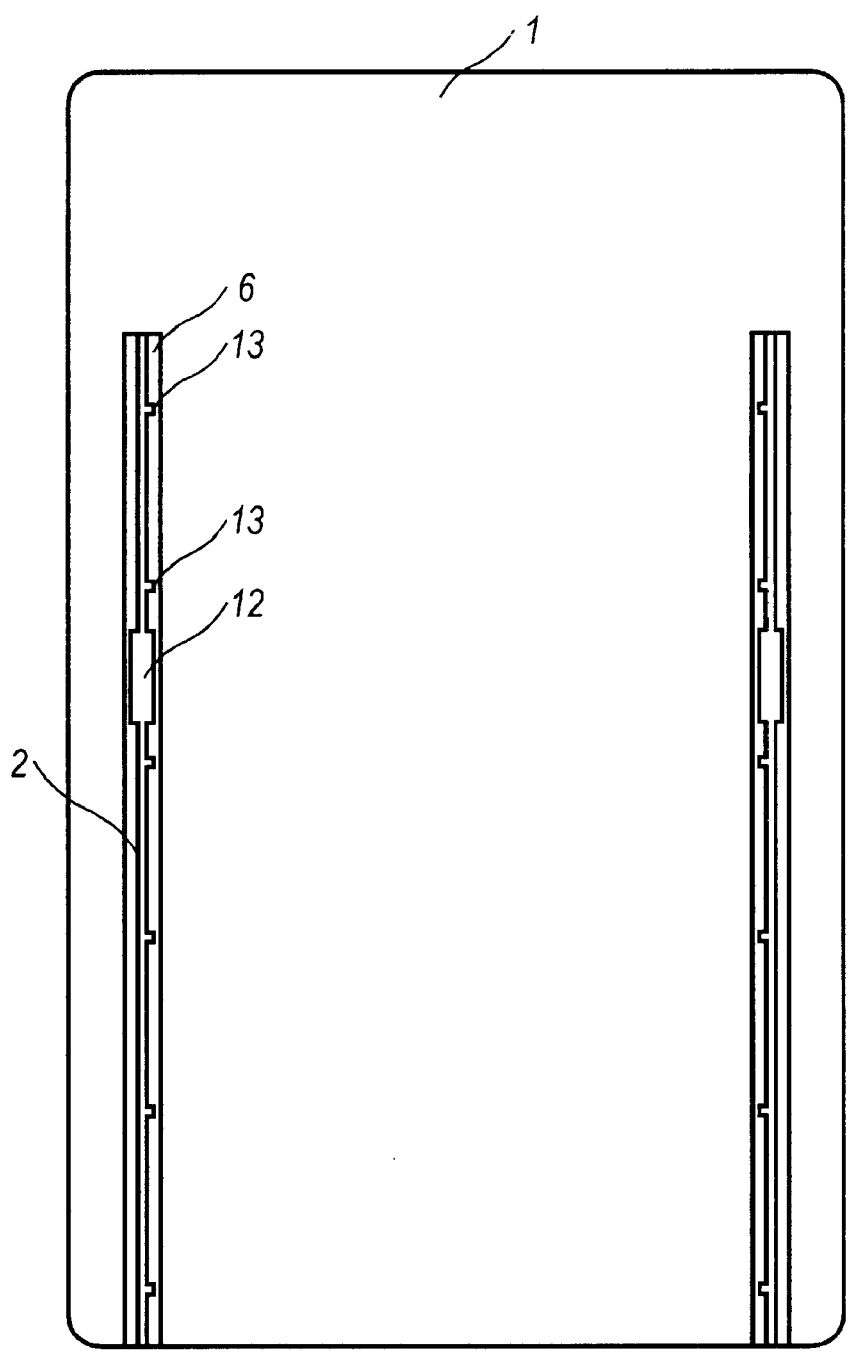
FIG. 2 is a top plan view of a vehicle roof with rail profiles fixed thereto.
Figure 3:
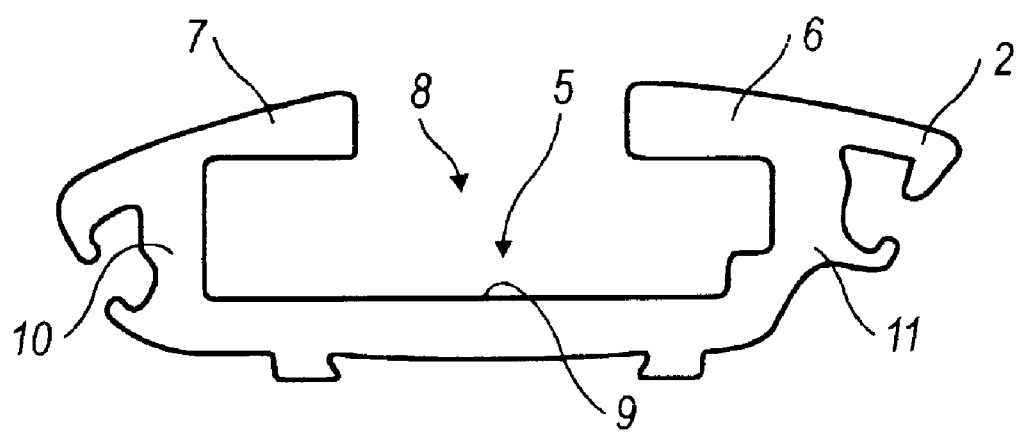
FIG. 3 is a cross-sectional view of an exemplary rail profile, taken essentially perpendicular to a long axis of the rail.

FIG. 1 shows part of a vehicle roof 1 to which a rail profile 2 is fixed. A load carrier foot 3 is mounted on the rail profile 2 and a load carrier 4 is attached to the load carrier foot 3. FIG. 2 shows a vehicle roof, viewed from above, with two rail profiles fixed thereto. It is readily apparent to one skilled in the art that the intention is that each respective rail profile shall have mounted thereon a respective load carrier foot with a load carrier extending between them. FIG. 3 shows a rail profile 2 in cross-section and from which it appears that the profile possesses a cavity S with upturned walls 6 and 7 enclosing between them a gap 8 which is in communication with the cavity 5. It is further apparent that the rail profile has a bottom 9 and two walls 10 and 11. It is apparent from FIG. 2 that the rail profile possesses a mounting opening 12 and that there are notches 13 disposed along the wall 6.

Figure 4:
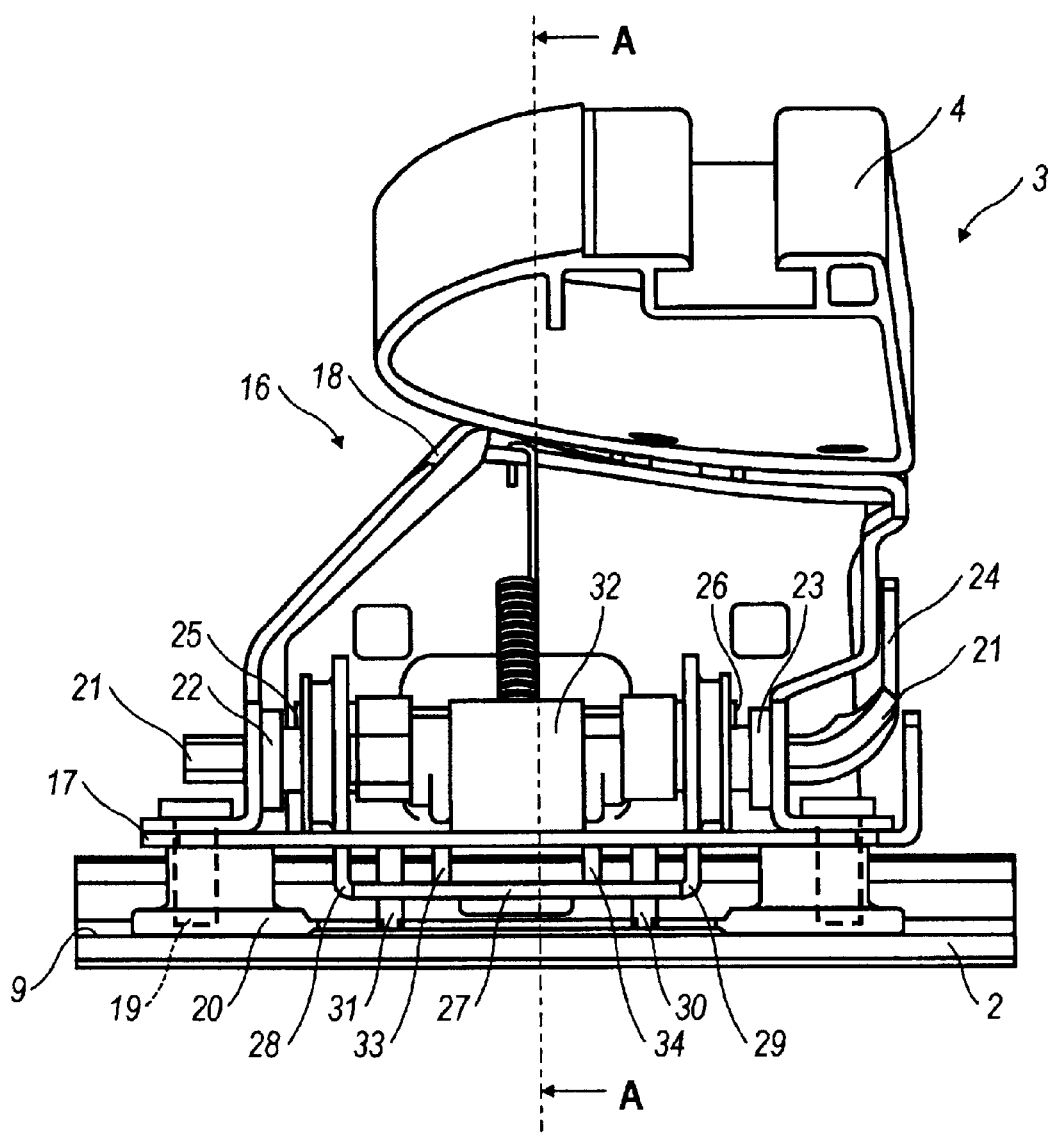
FIG. 4 is a side elevational view, shown in partial cutaway, of an exemplary load carrier foot arrangement according to the present invention, including the receiving rail structure.

FIG. 4 shows a load carrier foot 3, viewed from the side and mounted on a rail profile 2. For the clearer illustration of the invention, the cover 14 that is depicted in FIG. 1 and which covers the load carrier foot is omitted and the side of the rail profile 2 facing the observer is shown in cutaway, or as if it is transparent. As it appears from FIG. 2, the load carrier foot 3 includes a foot element 16 comprising a base element 17 and a casing element 18. The base element 17 and casing element 18 may be united by welding, riveting and other suitable methods recognized by those skilled in the art. Similarly, the attachment of the load carrier 4 to the casing element 18 may be similarly effected by welding, riveting and other suitable methods likewise familiar to the persons skilled in these arts.

The base element 17 is attached to an anchor portion by means of screws 19 and including a slide shoe 20 which supports the base element 17 and slides on the rail bottom 9. A splined locking spindle 21 is rotatably mounted in the casing element 18 by means of bearing seats 22 and 23 which are fixed in a known manner to the casing element 18. The locking spindle 21 possesses an operating element 24 by which the locking spindle is easily turned. Mounted on the locking spindle 21 are eccentric cams 25 and 26 whose function will be apparent from the descriptions of FIGS. 5–9 found hereinbelow.

A locking member of plate 27 is rotatably connected to the cams 25 and 26 by means of connecting elements 28 and 29, respectively. The locking plate 27 is guided in the rail profile 2 through the provision of two posts 30 and 31, disposed on a sliding shoe 20 and passing through respective holes in the locking plate 27. A retaining catch or catch means 32 is mounted rotatably and eccentrically on the locking spindle 21. The base element 17 possesses a first and a second integrated downturned tab 33 and 34, respectively, between which the retaining catch 32 is located when the retaining catch 32 is inserted down into a notch 13 and which prevent the retaining catch 32 from moving relative to the base element 17 in the lengthwise direction of the rail profile 2.

Figure 5:
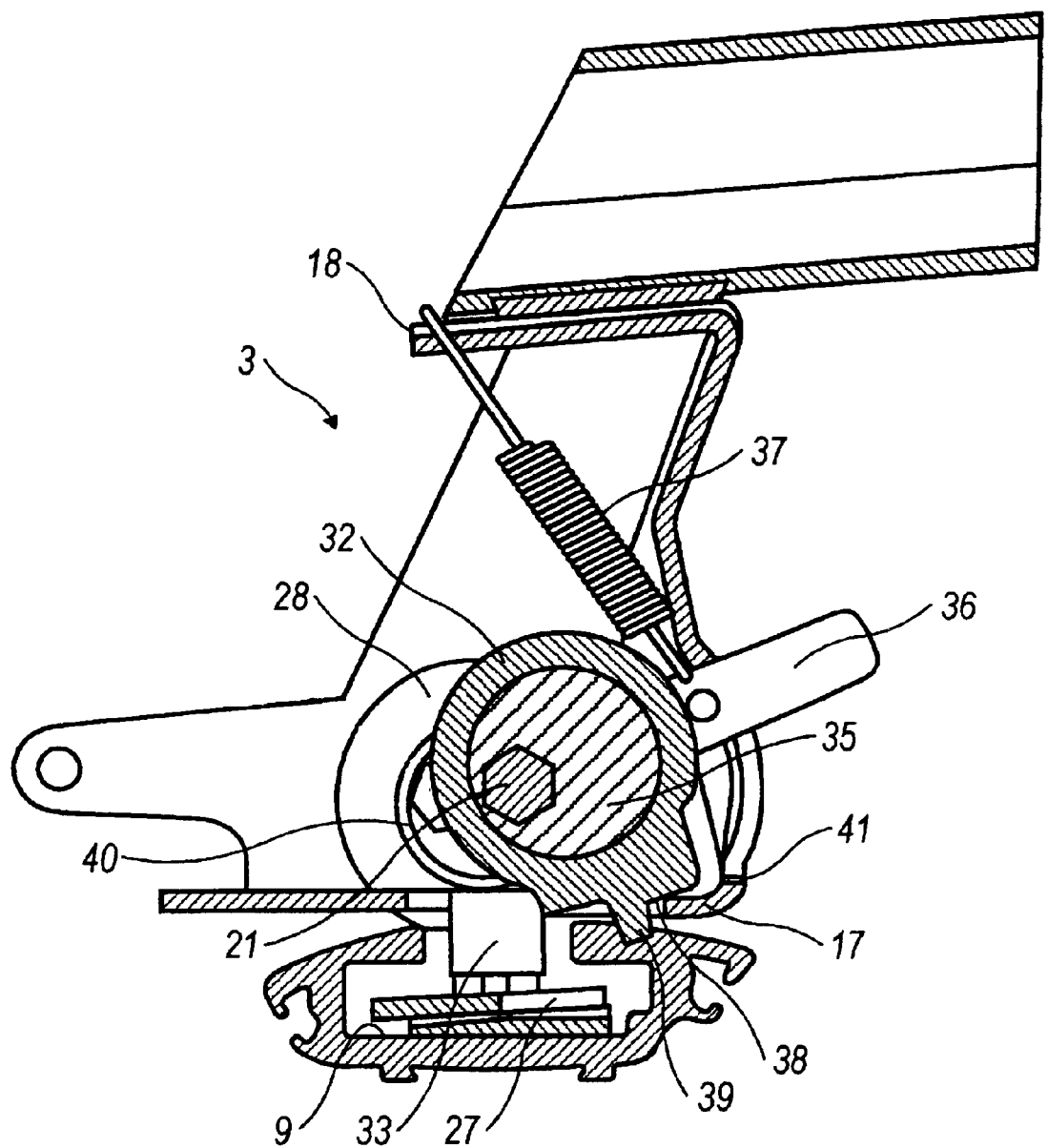
FIG. 5 is a cross-sectional view taken along line A—A shown in FIG. 4, and in which the load carrier foot is depicted in a mounting or installation position.
Figure 6:
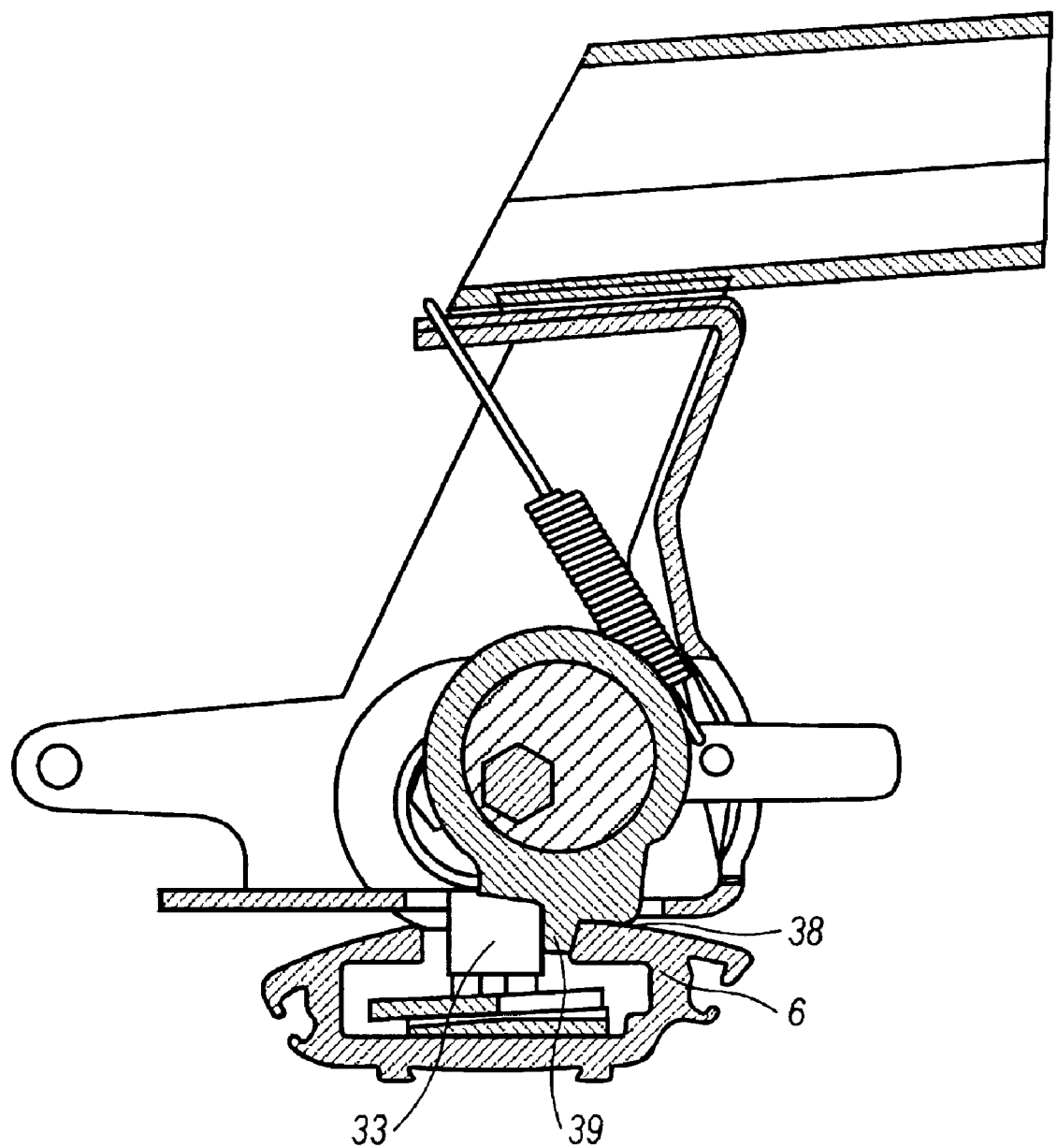
FIG. 6 is a similar cross-sectional view taken along line A—A shown in FIG. 4, but the load carrier foot has been fully inserted or installed into the rail profile away from the mounting position.
Figure 7:
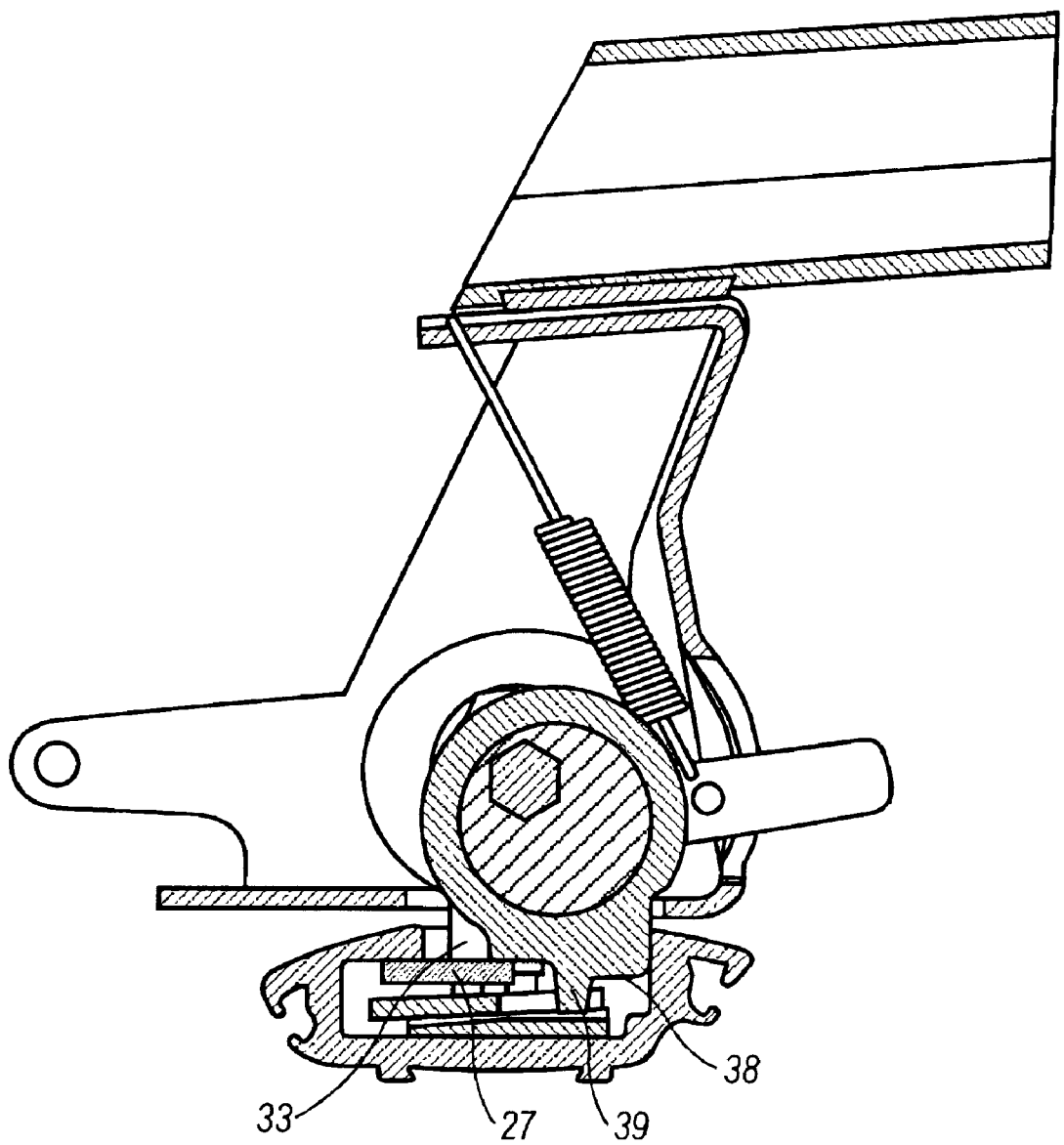
FIG. 7 is another cross-sectional view taken along line A—A shown in FIG. 4, but the load carrier foot has been moved to a position in which locking can be accomplished.
Figure 8:
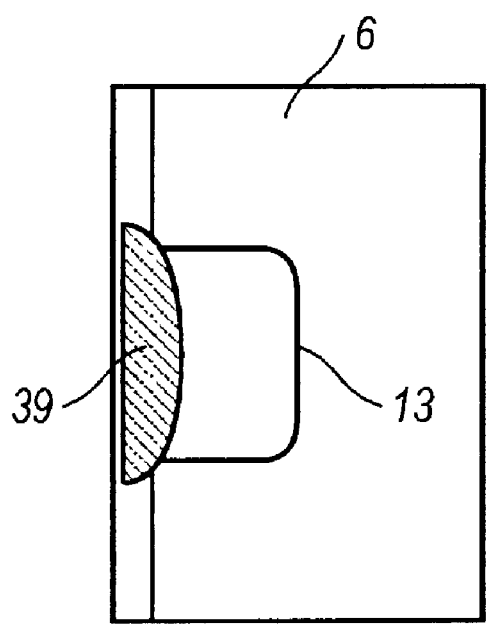
FIG. 8 is a view showing the relationship between a notch in the rail and the cross-sectional area of the sensing element.
Figure 9:
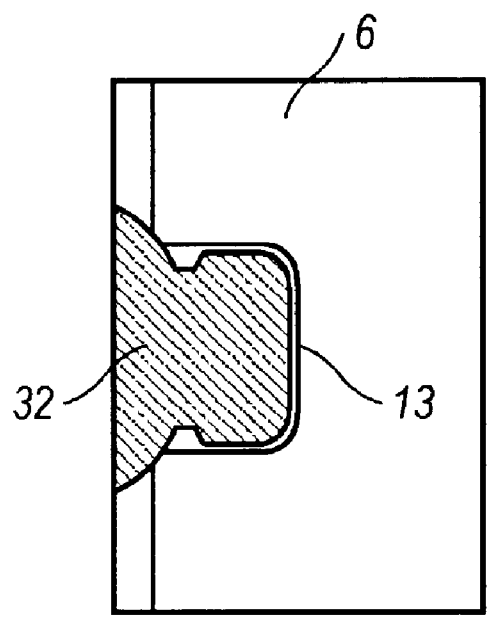
FIG. 9 is a view showing the relation between a notch in the rail and the cross-sectional area of the retaining catch.

FIGS. 5 through 7 are respective sectional views taken along the line A—A of FIG. 4. In FIG. 5 the load carrier foot is placed in the mounting opening 12 of the rail profile. In FIG. 6 the load carrier foot has been introduced into the rail profile in a position between the notches 13. In FIG. 7 the load carrier foot is shown with the retaining catch in engagement with a notch 13. In these figures, the locking spindle 21 is shown as being hexagonal. This shape is chosen to facilitate the non-rotatable mounting of the eccentric cams and the retaining catch on the locking spindle. It will be evident to one skilled in the art that the hexagonal section transitions to a circular section in the area where the locking spindle is journalled to the bearing seats.

The retaining catch 32 is carried by the locking spindle 21 and is rotatably supported on a bushing 35 which is eccentrically and non-rotatably mounted on the locking spindle 21. The retaining catch 32 is provided with a lug 36 to which an elastic element, exemplarily in the form of a helical spring 37, is attached at one end thereof. The other end of the helical spring is attached to the casing element 18. This achieves a counter-clockwise prestressing of the retaining catch 32. Also apparent from the figures are the stop face 38, integrated with the retaining catch, and the sensing element, member or means 39. Further apparent from the figures are the eccentric cam 25 and the connecting element 28 of the locking plate 27. As can be seen, the connecting element 28 exhibits a circular bearing surface 40 which is engaged by, and actuated by, the eccentric cam 25. It will be evident to one skilled in the art that the cam 26 and the connecting element 29 are designed to have a configuration matching the cam 25 and the connecting element 28.

Functioning of the invention will now be described with reference to FIGS. 5–9. The load carrier foot 3 is mounted on the rail profile 2 by inserting the sliding shoe 20 into the mounting opening 12. The mounting opening is of such a size that the sensing element 39 is not actuated and the retaining catch 32 is prestressed by the helical spring 37 in a counter-clockwise direction to a position wherein the stop face 38 is located above an edge region 41 of the base element 17 as may be appreciated in FIG. 5. If the locking spindle 21 is now turned, the stop face 38 will strike against the edge region or blocking means 41, whereby further turning of the locking spindle is blocked. By this means or arrangement, it is ensured that the locking spindle 21 cannot be brought into locked position while the load carrier foot is in a mounting position.

When the load carrier foot is moved along the rail profile, the sensing element 39 actuated by the wall 6 of the rail and the retaining catch 32 will be rotated clockwise to the position that is shown in FIG. 6. In this position the retaining catch 32 has been rotated to a position wherein the stop face 38 does not strike the edge region 41, however, the wall 6 of the rail will be struck if the locking spindle is turned in the locking direction. In this way, the locking spindle 21 is prevented from being turned to its locked position. As the load carrier foot is moved along the rail profile, the sensing element 39, under the force or bias exerted by the helical spring 37, will snap into an encountered notch 13 to the position shown in FIG. 8. It is further apparent from FIG. 8 that the sensing element 39 is of an extension and shape such that the sensing element is easily moved past a notch in the rail as the load carrier foot is shifted along the rail profile. Exemplarily, and as illustrated, the sensing means 39 has a dome-shaped button portion that advantageously enables this function. It is from this encounter of the sensing element 39 with a notch 13 that a indication, for example by a minor increase in resistance to travel, is given that the retaining catch 32 is in a region where it can be pushed down into the sensed notch 13 assuming the configuration shown in FIGS. 7 and 9. In this position, the locking spindle 21 can be turned to its locked position, and in this locked position, the retaining catch 32 has been pressed down into the encountered notch 13 in the wall 6 of the rail. At the same time, the retaining catch is enclosed by the tabs 33 and 34 of the base element. In this way, relative movement between the rail profile and the base element is prevented as may be best appreciated in FIG. 4.

It is further apparent from the figures and readily evident to those persons skilled in the art that as the locking spindle 21 is rotated, the eccentrically arranged cams 25 and 26 will likewise be rotated from the position shown in FIG. 5 to the position in FIG. 7. By this action, the connecting elements 28 and 29 raise the locking plate 27 into frictional locking engagement with the rail profile, and in this way locking the load carrier foot to the rail profile.

The invention is of course not limited by the above description but only by the following claims.

What is claimed is:

1. A load carrier foot arrangement comprising a load carrier foot (3) which supports a load carrier (4) and which is designed to be mounted on an elongated rail profile (2) which is mounted on a vehicle body, said rail profile having a cross-section exhibiting a cavity (5) and upturned walls (6,7) enclosing between them a gap (8) which is in communication with the cavity and wherein the walls in one area thereof exhibit a mounting opening (12) in which the load carrier foot is mounted and wherein at least one of the walls exhibits along its length one or more notches (13) and wherein the load carrier foot has a locking device comprising a locking plate (27) which is located in the cavity when the load carrier foot is mounted on the rail profile and wherein the locking plate is attached by connecting elements (28,29) to a locking spindle (21) which is rotatably mounted in the load carrier foot and equipped with a first set of eccentric cams (25, 26) to which the connecting elements are attached in such a manner that the locking plate is moved towards and away from the load carrier foot depending on the direction of rotation of the locking spindle, whereby the locking plate is brought into engagement with the walls (6,7) of the rail when moved in the locking direction towards the load carrier foot, whereby the load carrier foot is prevented from moving along the rail profile, and wherein the locking spindle has a second eccentric area (35) to which a retaining catch (32) is rotatably mounted, which retaining catch, when the locking plate is moved in the direction of load carrier foot, is inserted into a notch in the rail when the load carrier foot is so positioned on the rail profile that the retaining catch assumes a position on the rail profile which is aligned with a notch, whereby any movement of the load carrier foot along the rail profile is prevented through the interference of the retaining catch with the edge regions of the notch if the load carrier foot tends to shift on the rail profile, wherein the retaining catch (32) possesses a stop face (38) and a sensing element (39), that the retaining catch is prestressed by tensioning means (37) to a position such that the stop face (38) interferes obstructively with an edge region (41) of the base element (17) of the load carrier foot (3) when the sensing element is not actuated whereby the rotation of the spindle is prevented, and the mounting opening (12) is of such a size that the sensing element is not actuated when the load carrier foot is mounted in the mounting opening.

2. A load carrier foot arrangement according to claim 1, wherein the sensing element (39), when the load carrier foot (3) is moved along the rail profile (2) away from the mounting position (12), is continuously actuated in opposition to a prestressing force by the rail wall (6) exhibiting notches (13) to assume a position such that the stop face (38) can move past the edge region (41) but interferes obstructively with the top of the rail wall (6) thus preventing rotation of the locking spindle to the locked position.

3. A load carrier foot arrangement comprising a load carrier foot (3) which supports a load carrier (4) and which is designed to be mounted on an elongated rail profile (2) which is mounted on a vehicle body, said rail profile having a cross-section exhibiting a cavity (5) and upturned walls (6,7) enclosing between them a gap (8) which is in communication with the cavity and wherein the walls in one area thereof exhibit a mounting opening (12) in which the load carrier foot is mounted and wherein at least one of the walls exhibits along its length one or more notches (13) and wherein the load carrier foot has a locking device comprising a locking plate (27) which is located in the cavity when the load carrier foot is mounted on the rail profile and wherein the locking plate is attached by connecting elements (28,29) to a locking spindle (21) which is rotatably mounted in the load carrier foot and equipped with a first set of eccentric cams (25, 26) to which the connecting elements are attached in such a manner that the locking plate is moved towards and away from the load carrier foot depending on the direction of rotation of the locking spindle, whereby the locking plate is brought into engagement with the walls (6,7) of the rail when moved in the locking direction towards the load carrier foot, whereby the load carrier foot is prevented from moving along the rail profile, and wherein the locking spindle has a second eccentric area (35) to which a retaining catch (32) is rotatably mounted, which retaining catch, when the locking plate is moved in the direction of load carrier foot, is inserted into a notch in the rail when the load carrier foot is so positioned on the rail profile that the retaining catch assumes a position on the rail profile which is aligned with a notch, whereby any movement of the load carrier foot along the rail profile is prevented through the interference of the retaining catch with the edge regions of the notch if the load carrier foot tends to shift on the rail profile, wherein the retaining catch (32) possesses a stop face (38) engageable upon the rail wall (6) and a sensing element (39), that the retaining catch is prestressed by a tensioning means (37) to assume a position such that the sensing element contacts the rail wall (6) possessing notches (13) as the load carrier foot is moved along the rail profile (2), that the sensing element is snapped into the notches by the prestressing force as the sensing element moves past said notches, providing an indication of the position of the load carrier foot (3) in which indicated position the retaining catch can be inserted downwards into a notch.

4. A load carrier foot adapted to be mounted upon a vehicle-carried elongate rail profile having an internal cavity at least partially surrounded by a pair of upturned walls that define an access gap space therebetween that is variably configured to releasably accept mounting of said load carrier foot, said load carrier foot comprising:

a locking member adjustably connected to a foot element of said load carrier foot, a locking plate configured to be insertibly received in the internal cavity of an elongate rail profile;

a sensing member rotatably connected to a biasing member and configured to be biased into abutting engagement with the elongate rail profile and adapted to provide location indications of receiving notches in the elongate rail profile resulting from sliding motion along a length of said elongate rail; and a retaining catch connected to said foot element and configured to be transitioned into a locked position when a receiving notch is indicated by said sensing member.

5. A load carrier arrangement comprising:

a load carrier foot configured to be releasably installed upon a carrying vehicle;

an elongate rail profile mounted on a carrying vehicle, said profile having a mounting opening configured to insertibly receive an anchor portion of said load carrier foot;

said elongate rail profile further having an internal cavity at least partially surrounded by a pair of upturned walls that define an access gap space therebetween;

a plurality of notches extending through one of said pair of upturned walls, each of said notches configured to indicatively engage a sensing means of said load carrier foot and lockingly receive a retaining catch of said load carrier foot;

a sensing means connected to said load carrier foot and to a biasing means for abuttingly engaging said elongate rail profile and for providing indications of encounters with receiving notches in the elongate rail profile resulting from sliding motion along a length of said elongate rail; and a catching means configured to be received in at least one of said plurality of notches in said elongate rail profile, said catch means connected to said load carrier foot, to said biasing means and to an actuator for fixing said load carrier foot along a length of said elongate rail profile exclusively when proper alignment with a notch is achieved and indicated by said sensing means.

6. The load carrier arrangement of claim 5, wherein said sensing means further comprises a dome-shaped button portion for engaging said plurality of notches during travel of said load carrier foot along a length of said elongate rail profile, indicating each encounter with individual notches of said plurality of notches, and facilitating continued travel of said load carrier foot across each individual notch of said plurality of notches.

7. The load carrier arrangement of claim 5, wherein said load carrier foot further comprises a blocking means for preventing transition of said load carrier foot to a locked configuration when in said mounting opening.

8. The load carrier arrangement of claim 5, wherein said catch means is rotatably supported on a spindle.

9. The load carrier arrangement of claim 5, wherein said catch means is rotatably supported on a bushing that is eccentrically mounted on a spindle.

10. The load carrier arrangement of claim 5, wherein said catch means is rotatably supported on a bushing that is eccentrically and non-rotatably mounted on a splined spindle.

11. The load carrier arrangement of claim 10, wherein said splined spindle is cross-sectionally hexagonal in shape.

12. The load carrier arrangement of claim 10, further comprising:

an eccentric cam fixed on said splined spindle and connected to a locking plate for moving said locking plate into a locked orientation in abutting engagement with an interior surface of said elongate rail profile.

13. The load carrier arrangement of claim 10, further comprising:

a pair of eccentric cams, each cam fixed on said splined spindle and connected to a respective locking plate for moving said locking plate into a locked orientation in abutting engagement with an interior surface of said elongate rail profile.

14. The load carrier arrangement of claim 5, wherein said sensing means is rotatably supported on a spindle.

15. The load carrier arrangement of claim 5, wherein said sensing means is rotatably supported on a bushing that is eccentrically mounted on a spindle.

16. The load carrier arrangement of claim 5, wherein said sensing means is rotatably supported on a bushing that is eccentrically and non-rotatably mounted on a splined spindle.

17. The load carrier arrangement of claim 16, wherein said splined spindle is cross-sectionally hexagonal in shape.

18. The load carrier arrangement of claim 16, further comprising:

an eccentric cam fixed on said splined spindle and connected to a locking plate for moving said locking plate into a locked orientation in abutting engagement with an interior surface of said elongate rail profile.

19. The load carrier arrangement of claim 16, further comprising:

a pair of eccentric cams, each cam fixed on said splined spindle and connected to a respective locking plate for moving said locking plate into a locked orientation in abutting engagement with an interior surface of said elongate rail profile.

20. The load carrier arrangement of claim 16, wherein said sensing means and said catch means is unitarily constructed thereby assuring synchronous movement therebetween.

\* \* \* \* \*